United States Patent
Hasan et al.

(10) Patent No.: US 10,935,001 B2
(45) Date of Patent: Mar. 2, 2021

(54) SYSTEM AND METHOD FOR MONITORING WEAR ON A GEARBOX OF A WIND TURBINE

(71) Applicant: General Electric Company, Schenectady, NY (US)

(72) Inventors: Raed Zuhair Hasan, Greenville, SC (US); Farong Zhu, Simpsonville, SC (US); Lawrence Keith Taliaferro, Jr., Greenville, SC (US); Priyangu Chunilal Patel, Simpsonville, SC (US); James Edward Cencula, Greer, SC (US); Edward Lee McGrath, Greer, SC (US)

(73) Assignee: General Electric Company, Schenectady, NY (US)

( * ) Notice: Subject to any disclaimer, the term of this patent is extended or adjusted under 35 U.S.C. 154(b) by 785 days.

(21) Appl. No.: 15/801,436

(22) Filed: Nov. 2, 2017

(65) Prior Publication Data

US 2019/0128243 A1   May 2, 2019

(51) Int. Cl.
| | |
|---|---|
| F03D 17/00 | (2016.01) |
| F03D 7/04 | (2006.01) |
| F03D 15/00 | (2016.01) |
| F03D 7/02 | (2006.01) |
| G01M 13/021 | (2019.01) |
| G01M 13/022 | (2019.01) |
| H02P 9/04 | (2006.01) |

(52) U.S. Cl.
CPC ............ *F03D 17/00* (2016.05); *F03D 7/0264* (2013.01); *F03D 7/04* (2013.01); *F03D 15/00* (2016.05); *G01M 13/021* (2013.01); *G01M 13/022* (2013.01); *F05B 2260/4031* (2013.01); *F05B 2260/80* (2013.01); *F05B 2270/327* (2013.01); *F05B 2270/332* (2013.01); *F05B 2270/335* (2013.01); *F05B 2270/807* (2013.01); *F05B 2270/808* (2013.01); *H02P 9/04* (2013.01)

(58) Field of Classification Search
CPC ........ F03D 17/00; F03D 15/00; F03D 7/0264; F03D 7/04
See application file for complete search history.

(56) References Cited

U.S. PATENT DOCUMENTS

| | | | |
|---|---|---|---|
| 8,955,394 B2 | 2/2015 | Voss et al. | |
| 9,160,266 B2 * | 10/2015 | Vath ....................... | F03D 15/00 |
| 2008/0140349 A1 | 6/2008 | Behera et al. | |

(Continued)

FOREIGN PATENT DOCUMENTS

| | | |
|---|---|---|
| EP | 2053241 | 4/2009 |
| WO | WO2017036615 A1 | 3/2017 |

OTHER PUBLICATIONS

Partial European Search Report and Provisional Opinion, EP Application No. 18203855.44-1001, dated Mar. 6, 2019, 14 pages.

*Primary Examiner* — Janet L Suglo
(74) *Attorney, Agent, or Firm* — Dority & Manning, P.A.

(57) ABSTRACT

The present disclosure is directed to a system for monitoring wear on a gearbox of a wind turbine. A controller of the system is configured to determine a torque exerted on a rotor shaft of the wind turbine or a generator shaft of the wind turbine based on measurement signals received from a first sensor of the system. The controller is also configured to determine an accumulated wear value for the gearbox based on the torque.

20 Claims, 5 Drawing Sheets

(56) References Cited

U.S. PATENT DOCUMENTS

| | | | |
|---|---|---|---|
| 2012/0025526 A1* | 2/2012 | Luo | F03D 80/70 |
| | | | 290/44 |
| 2012/0029838 A1* | 2/2012 | Hallman | G01H 1/003 |
| | | | 702/34 |
| 2012/0029892 A1* | 2/2012 | Thulke | G05B 17/02 |
| | | | 703/7 |
| 2015/0167637 A1 | 6/2015 | Kooijman et al. | |
| 2015/0177022 A1 | 6/2015 | Vath et al. | |

\* cited by examiner

SYSTEM AND METHOD FOR MONITORING WEAR ON A GEARBOX OF A WIND TURBINE

FIELD

The present disclosure generally relates to wind turbines. More particularly, the present disclosure relates to systems and methods for monitoring wear on a gearbox of a wind turbine.

BACKGROUND

Wind power is considered one of the cleanest, most environmentally friendly energy sources presently available, and wind turbines have gained increased attention in this regard. A modern wind turbine typically includes a tower, a nacelle mounted on the tower, a generator positioned in the nacelle, and one or more rotor blades. The one or more rotor blades convert kinetic energy of wind into mechanical energy using known airfoil principles. A drivetrain transmits the mechanical energy from the rotor blades to the generator. The generator then converts the mechanical energy to electrical energy that may be supplied to a utility grid.

The drivetrain may include a gearbox, a rotor shaft, and a generator shaft. More specifically, the rotor shaft may couple the rotor blades to the gearbox. The generator shaft may, in turn, couple the gearbox to the generator. As such, the drivetrain and, in particular, the gearbox may allow the generator to rotate at a different speed than the rotor blades.

In general, the gearbox must be periodically replaced. It is typically necessary to schedule the replacement of gearbox well in advance of the actual replacement operation to minimize wind turbine down time and ensure availability of a replacement gearbox and necessary equipment (e.g., a crane). In this respect, various systems and methods have been developed to monitor or otherwise predict when replacement of the gearbox is necessary. Such systems and methods are based on predetermined profiles of the operating conditions that the gearbox is expected to experience. However, the actual operating conditions experienced by the gearbox may vary greatly. For example, if the actual operating conditions are more severe than the expected operating conditions, gearbox replacement may be required before the conventional systems and method indicate such replacement is necessary. In this respect, when the gearbox wears out before a planned replacement operation, extensive wind turbine down time may occur if the replacement gearbox and necessary repair equipment are unavailable.

Accordingly, an improved system and method for monitoring wear on a gearbox of a wind turbine would be welcomed in the art.

BRIEF DESCRIPTION

Aspects and advantages of the technology will be set forth in part in the following description, or may be obvious from the description, or may be learned through practice of the technology.

In one aspect, the present disclosure is directed to a system for monitoring wear on a gearbox of a wind turbine. The system includes a wind turbine having a rotor, a gearbox, a rotor shaft coupling the rotor and the gearbox, a generator, and a generator shaft coupling the gearbox and the generator. The system also includes a first sensor configured to detect a parameter indicative of a torque exerted on the rotor shaft or the generator shaft. Furthermore, the system includes a controller communicatively coupled to the torque sensor. The controller is configured to determine the torque exerted on the rotor shaft or the generator shaft based on measurement signals received from the first sensor. The controller is also configured to determine an accumulated wear value for the gearbox based on the torque.

In another aspect, the present disclosure is directed to a method for monitoring wear on a gearbox of a wind turbine. The wind turbine includes a rotor, a gearbox, a rotor shaft coupling the rotor and the gearbox, a generator, and a generator shaft coupling the gearbox and the generator. The method includes receiving, with a controller, torque measurement signals from a torque sensor in operative association with one of the rotor shaft or the generator shaft. The torque measurement signals are indicative of a torque exerted on the rotor shaft or the generator shaft associated with the torque sensor. The method also includes determining, with the controller, the torque exerted on the rotor shaft or the generator shaft associated with the torque sensor based on the received torque measurement signals. The method further includes determining, with the controller, an accumulated wear value for the gearbox based on the torque. Moreover, the method includes comparing, with the controller, the accumulated wear value to a wear threshold. Additionally, the method includes initiating, with the controller, a control action associated with modifying a rate at which the gearbox incurs wear when the accumulated wear value exceeds the wear threshold.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
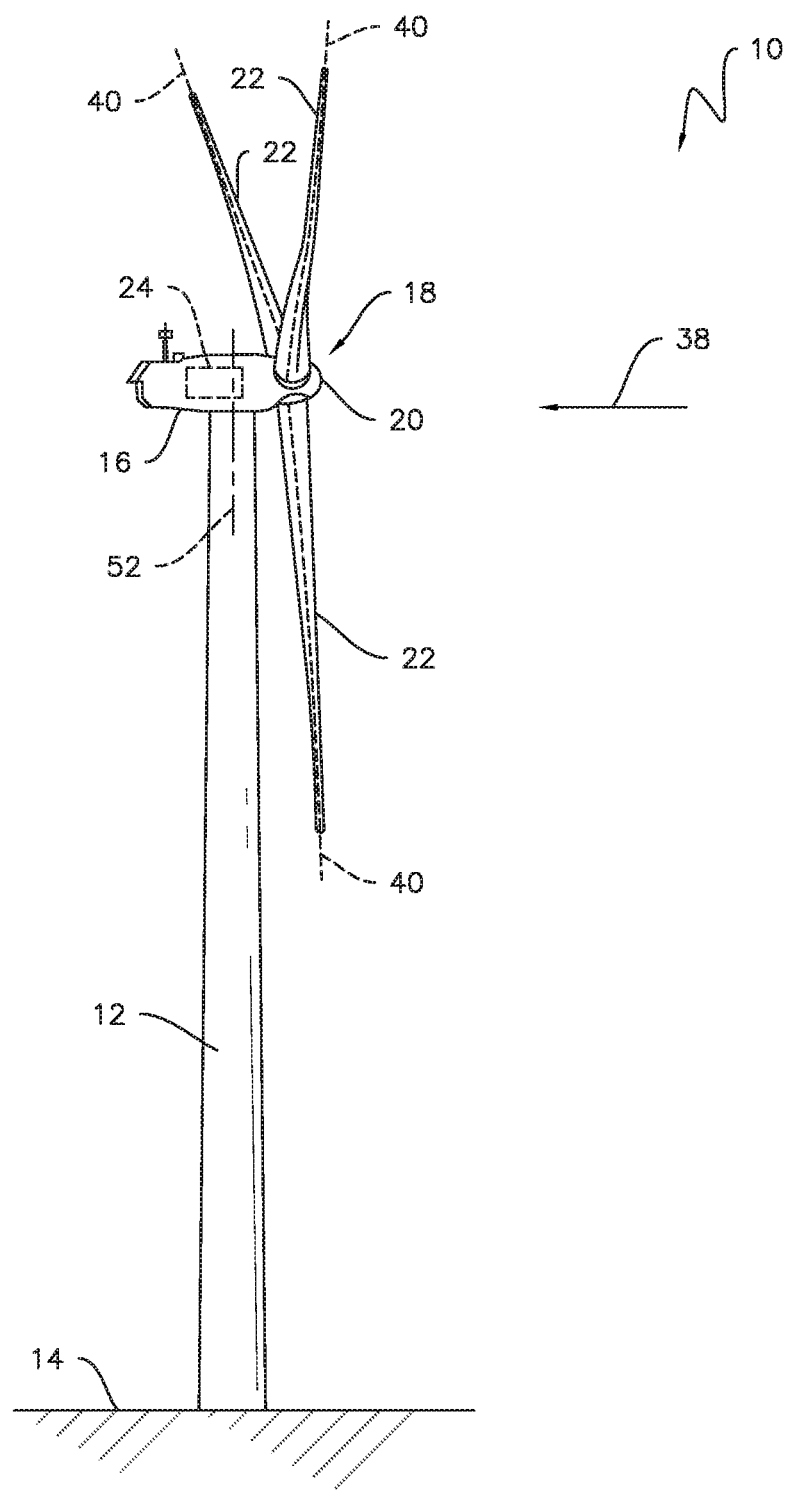
FIG. 1 is a perspective view of a wind turbine according to one embodiment of the present disclosure.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Referring now to the drawings, FIG. 1 is a perspective view of one embodiment of an exemplary wind turbine 10. As shown, the wind turbine 10 generally includes a tower 12 extending from a support surface 14, a nacelle 16 mounted on the tower 12, and a rotor 18 rotatably coupled to the nacelle 16. The rotor 18 includes a rotor hub 20 and at least one rotor blade 22 coupled to and extending outwardly from the hub 20. For example, in the embodiment shown in FIG. 1, the rotor 18 includes three rotor blades 22. In alternative embodiments, however, the rotor 18 may include more or less than three rotor blades 22. Each rotor blade 22 may be spaced about the hub 20 to facilitate rotation of the rotor 18 to convert kinetic energy from the wind into usable rotational, mechanical energy. A generator 24 positioned within the nacelle 16 may generate electrical power from the rotational energy of the rotor 18.

Figure 2:
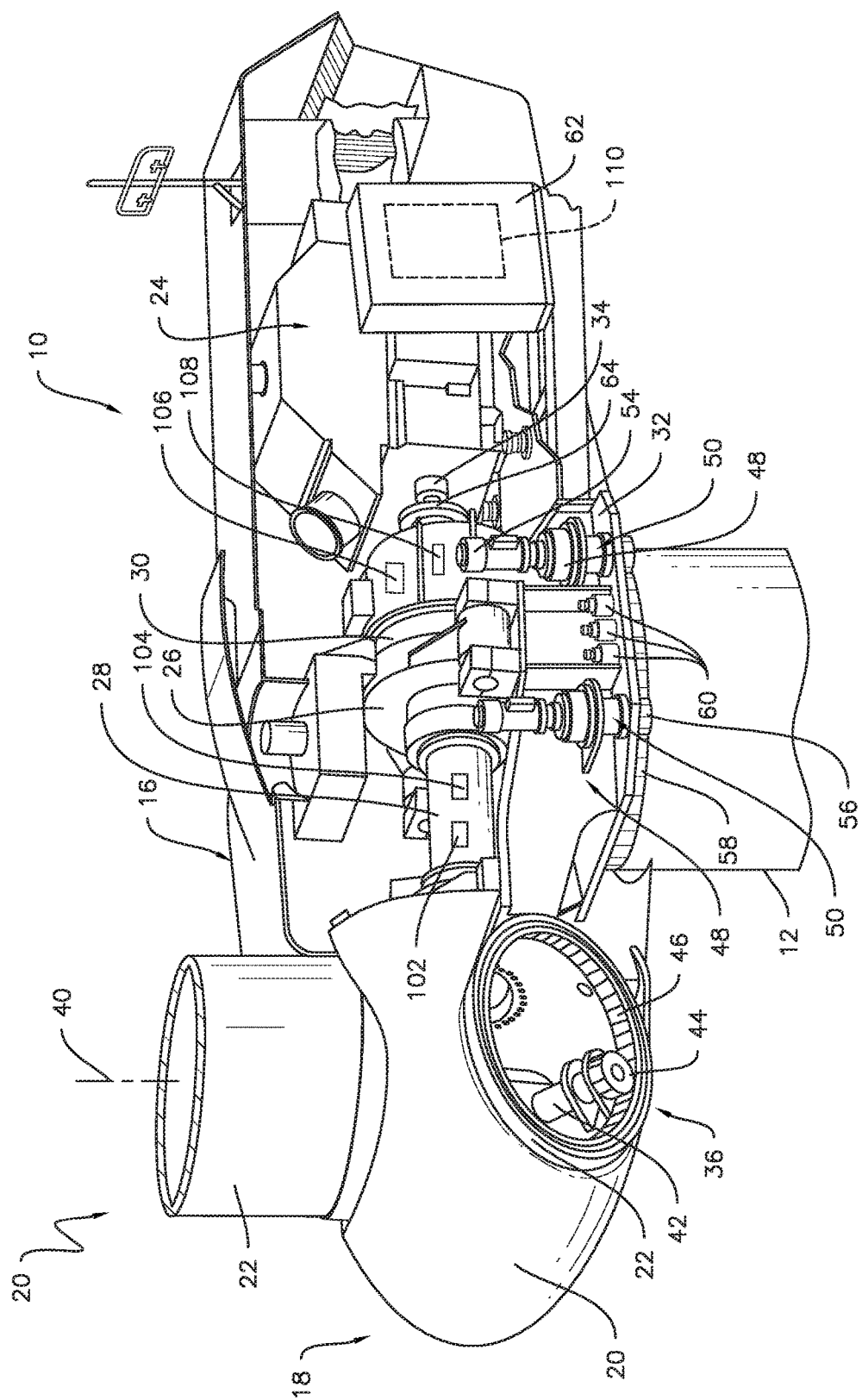
FIG. 2 is a perspective, internal view of a nacelle of a wind turbine according to one embodiment of the present disclosure.

Referring now to FIG. 2, a drivetrain 26 couples the rotor 18 to the electric generator 24. As shown, the drivetrain 26 may include a rotor shaft 28, which couples the rotor hub 20 to a gearbox 30. The gearbox 30 may be supported by and coupled to a bedplate 32 in the nacelle 16. The drivetrain 26 also include a generator shaft 34, which couples the gearbox 30 to the generator 24. In this respect, rotation of the rotor 18 drives the generator 24. More specifically, the rotor shaft 28 may provide a low speed, high torque input to the gearbox 30 in response to rotation of the rotor blades 22 and the hub 20. The gearbox 30 may then convert the low speed, high torque input into a high speed, low torque output to drive the generator shaft 34 and, thus, the generator 24. In addition, the drivetrain 26 may also include a braking system 64 configured to stop or slow the rotation of one or more components the drivetrain 26. For example, as shown in the illustrated embodiment, the braking system 64 may frictionally engage the generator shaft 34 to stop or slow the rotation thereof. Nevertheless, in alternative embodiments, the braking system 64 may frictionally engage the rotor shaft 28 or any other suitable component of the drivetrain 26.

The wind turbine 10 may also include one or more pitch adjustment mechanisms 36. Although FIG. 2 only illustrates one pitch adjustment mechanism 36, the wind turbine 10 may include three pitch adjustment mechanisms 36. In this respect, the wind turbine 10 may include one pitch adjustment mechanism 36 corresponding to each rotor blade 22. In alternate embodiments, however, the wind turbine 10 may include more or fewer pitch adjustment mechanisms 36.

Each pitch adjustment mechanism 36 may adjust a pitch angle of the corresponding rotor blade 22 (i.e., the angular orientation of the rotor blade 22 with respect to a direction 38 (FIG. 1) of the wind). In particular, each rotor blade 22 may be rotatably coupled to the hub 20 by a pitch bearing (not shown). As such, each pitch adjustment mechanism 36 may rotate the corresponding rotor blade 22 about a corresponding pitch axis 40 (FIG. 1) relative to the hub 20, thereby adjusting the pitch angle of the rotor blade 22.

FIG. 2 illustrates an exemplary embodiment of one of the pitch adjustment mechanisms 36. More specifically, the pitch adjustment mechanism 36 may include an electric motor 42 having a pinion gear 44 coupled thereto. The pinion gear 44 may engage a ring gear 46 formed on or coupled to an inner surface of the rotor blade 22. During operation of the pitch adjustment mechanism 36, the electric motor 42 rotates the pinion gear 44. The pinion gear 44, in turn, rotates the ring gear 46, thereby rotating the rotor blade 22 about the corresponding pitch axis 40. In alternate embodiments, the pitch adjustment mechanism 36 may include any suitable type of actuator and/or any suitable structure or mechanism for transmitting the movement of the actuator to the corresponding rotor blade 22.

Furthermore, the wind turbine 10 may include a yaw drive 48 for adjusting a yaw angle of the nacelle 16 (i.e., the angular orientation of the nacelle 16 relative to the tower 12). In particular, the nacelle 16 may be rotatably coupled to the tower 12 by a yaw bearing (not shown). As such, the yaw drive 48 may include one or more yaw adjustment mechanisms 50, which rotate the nacelle 16 about a yaw axis 52 (FIG. 1) relative to the tower 12 to adjust the yaw angle of the nacelle 16. Although FIG. 2 illustrates two yaw adjustment mechanisms 50, the wind turbine 10 may include any suitable number of yaw adjustment mechanisms 50, such as a single yaw adjustment mechanism 50 or more than two yaw adjustment mechanisms 50. For example, certain embodiments of the yaw drive 48 may include four yaw adjustment mechanisms 50.

FIG. 2 illustrates an exemplary embodiment of the yaw adjustment mechanisms 50. More specifically, each yaw adjustment mechanism 50 may include an electric motor 54 mounted to and/or through the bedplate 32. Each electric motor 54 may include a pinion gear 56 coupled thereto, which engages a tower ring gear 58 coupled to the tower 12. During operation of the yaw adjustment mechanisms 50, the electric motors 54 rotate the corresponding pinion gears 56, which rotate the tower ring gear 58. The rotation of the pinion gears 56 relative to the tower ring gear 58 causes the nacelle 16 to rotate about the yaw axis 52 (FIG. 1). In alternate embodiments, the yaw adjustment mechanisms 50 may include any suitable type of actuator and/or any suitable structure or mechanism for transmitting movement between the tower 12 and the nacelle 16.

The yaw drive 48 may also include one or more brake assemblies 60 for controlling the rotation of the nacelle 16 about the yaw axis 52 (FIG. 1). For example, as shown in the illustrated embodiment, the brake assemblies 60 may be mounted to and/or through the bedplate 32. As such, each brake assembly 60 may frictionally engage the tower ring gear 58 or another suitable friction surface of the wind turbine 10 to stop, slow, and/or otherwise control the rotation of the nacelle 16 about the yaw axis 52. The wind turbine 10 may include any suitable number of brake assemblies 60. For instance, in an exemplary embodiment, the wind turbine 10 may include between twelve and twenty brake assemblies 60. In other embodiments, however, the wind turbine 10 may include less than twelve brake assemblies 60 or more than twenty brake assemblies 60.

Figure 3:
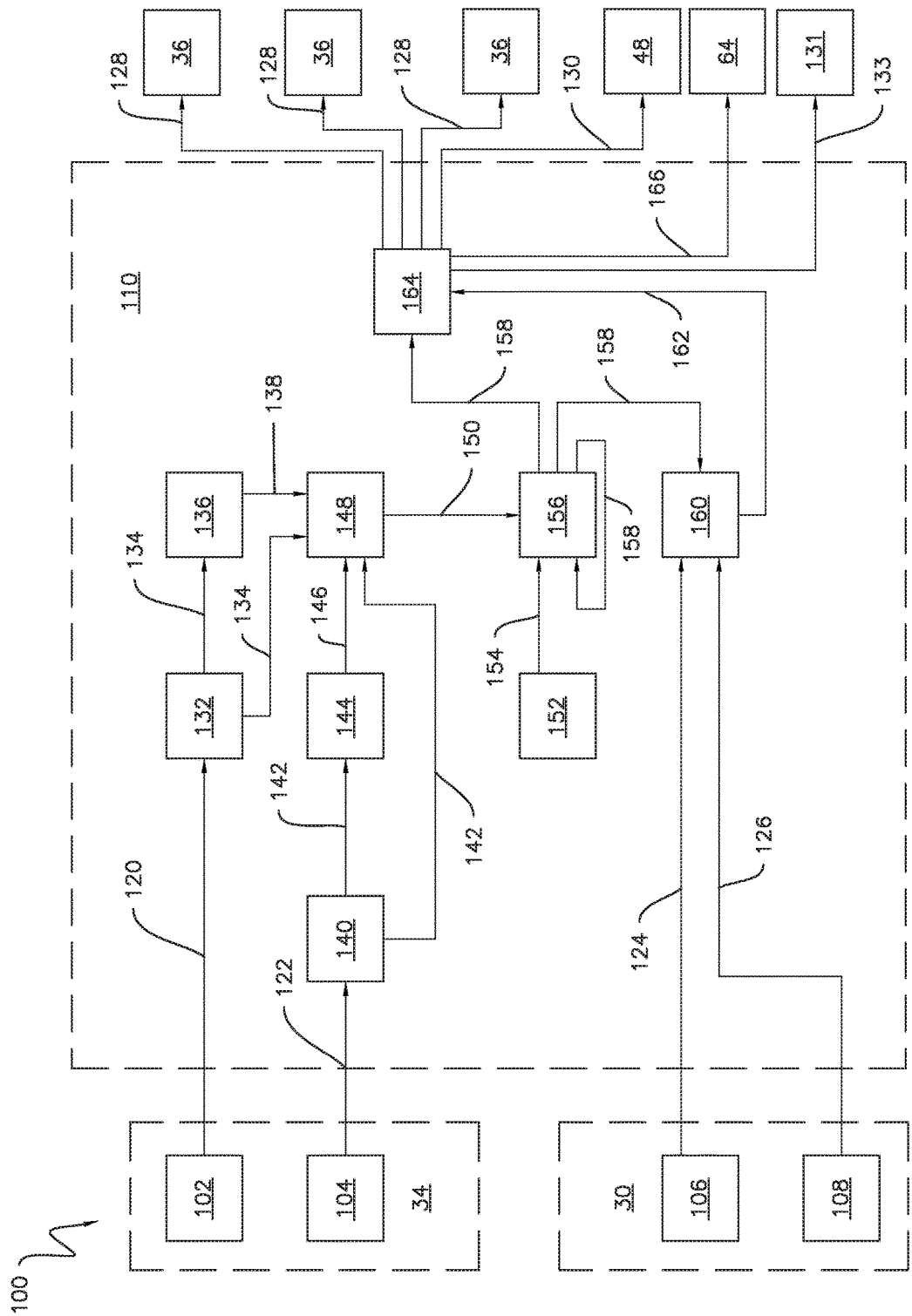
FIG. 3 is a schematic view of a system for monitoring wear on a gearbox of a wind turbine according to one embodiment of the present disclosure.

FIG. 3 illustrates one embodiment of a system 100 for monitoring wear on a gearbox of a wind turbine. In general, the system 100 will be described herein with reference to the wind turbine 10 described above and shown in FIGS. 1 and 2. Nevertheless, the disclosed system 100 may generally be used with wind turbines having any other suitable configuration.

As shown, the system 100 may include various sensors. In the embodiment shown in FIG. 3, for example, the system 100 includes a torque sensor 102, a rotational speed sensor 104, a vibration sensor 106, and an acoustic sensor 108. In alternate embodiments, however, the system 100 may include only some of the sensors 106, 108 or none of the sensors 106, 108. Furthermore, the system 100 may include other sensors (e.g., one or more bearing temperature sensors, oil temperature sensors, etc.) in addition to or lieu of the sensors 106, 108.

The torque sensor 102 is configured to detect a parameter indicative of a torque exerted on the rotor shaft 28 or the generator shaft 34, such as by the rotor 18. In this respect, in one embodiment, the torque sensor 102 may be operative association with the rotor shaft 28 such that the torque sensor 102 detects a parameter indicative of the torque exerted on the rotor shaft 28 as illustrated in FIG. 2. In another embodiment, as shown in FIG. 3, the torque sensor 102 may be operative association with the generator shaft 34 such that the torque sensor 102 detects a parameter indicative of the torque exerted on the generator shaft 34. The torque sensor 102 may be a contact torque sensor, such as a slip ring torque sensor, or a non-contact torque sensor, such as a rotary transformer or an infrared torque sensor. Furthermore, the torque sensor 102 may be a wired sensor or a wireless/telemetry sensor. Nevertheless, the torque sensor 102 may be any suitable sensor for detecting torque.

The rotational speed sensor 104 is configured to detect a parameter indicative of a rotational speed of one of the rotor shaft 28 or the generator shaft 34. In this respect, in one embodiment, the rotational speed sensor 104 may be operative association with the rotor shaft 28 such that the rotational speed sensor 104 detects a parameter indicative of the rotational speed of the rotor shaft 28 as illustrated in FIG. 2. In another embodiment, as shown in FIG. 3, the rotational speed sensor 104 may be operative association with the generator shaft 34 such that the rotational speed sensor 104 detects a parameter indicative of the rotational speed of the generator shaft 34. The rotational speed sensor 104 may be a Hall Effect sensor or any other suitable type of sensor for detecting rotational speed or rotational position.

The vibration sensor 106 is configured to detect a parameter indicative of vibrations occurring within or being emitted from the gearbox 30. In this respect, the vibration sensor 106 may be in operative association with the gearbox 30 as illustrated in FIGS. 2 and 3. The vibration sensor 106 may be an accelerometer, an eddy current sensor probe, a capacitance proximity sensor, or any other suitable type of sensor for detecting vibrations occurring within or being emitted from the gearbox 30.

The acoustic sensor 108 is configured to detect a parameter indicative of sounds or other acoustic signals occurring within or being emitted by the gearbox 30. In this respect, the acoustic sensor 108 may be in operative association with the gearbox 30 as illustrated in FIGS. 2 and 3. The acoustic sensor 108 may be a microphone or any other suitable type of sensor for detecting sounds or other acoustic signals occurring within or being emitted by the gearbox 30.

The system 100 also includes a controller 110 communicatively coupled to one or more components of the system 100 and/or the wind turbine 10, such as the sensors 102, 104, 106, 108, the pitch adjustment mechanisms 36, and the yaw drive 48. In the embodiment shown in FIG. 2, for example, the controller 110 is disposed within a control cabinet 62 mounted within the nacelle 16. In alternate embodiments, however, the controller 110 may be disposed at any location on or in the wind turbine 10, at any location on the support surface 14 (FIG. 1), or any other suitable location.

Figure 4:
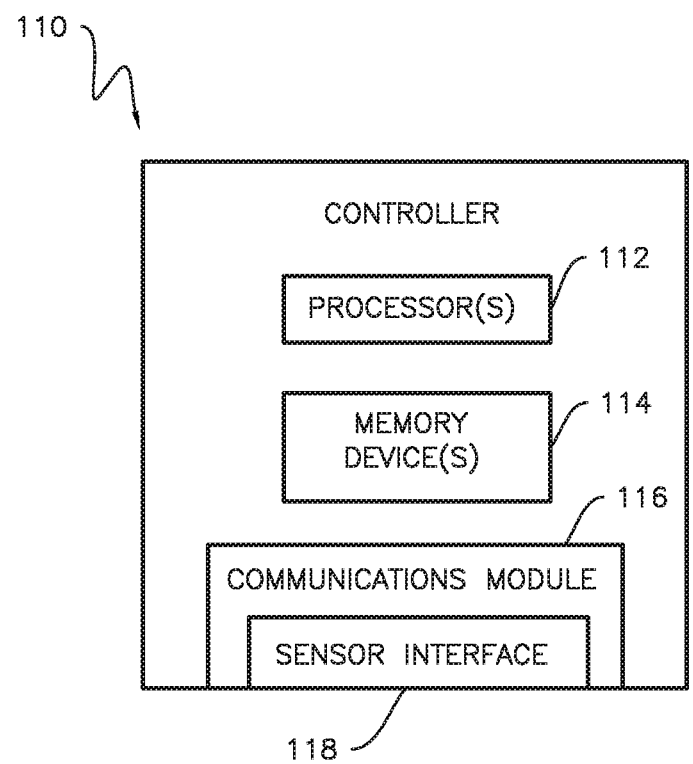
FIG. 4 is a schematic view of a controller of a system for monitoring wear on a gearbox of a wind turbine according to one embodiment of the present disclosure.

In general, the controller 110 may correspond to any suitable processor-based device, including one or more computing devices. As shown in FIG. 4, for example, the controller 110 may include one or more processors 112 and one or more associated memory devices 114 configured to perform a variety of computer-implemented functions (e.g., performing the methods, steps, calculations, and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory device(s) 114 may generally include memory element(s) including, but not limited to, a computer readable medium (e.g., random access memory (RAM)), a computer readable non-volatile medium (e.g., flash memory), a compact disc-read only memory (CD-ROM), a magneto-optical disk (MOD), a digital versatile disc (DVD), and/or other suitable memory elements or combinations thereof. The memory device(s) 114 may store instructions that, when executed by the processor 112, cause the processor 112 to perform functions (e.g., method 200 described below).

The controller 110 may also include a communications module 116 to facilitate communications between the controller 110 and the various components of the system 100 and/or the wind turbine 10. For example, the communications module 116 may permit the controller 110 to receive data from the sensors 102, 104, 106, 108. As such, the communications module 116 may include a sensor interface 118 (e.g., one or more analog-to-digital converters) that converts measurement signals 120, 122, 124, 126 received from the sensors 102, 104, 106, 108 into signals that can be understood and processed by the processor(s) 112. Furthermore, the communications module 116 may permit the controller 110 to transmit control signals 128 to each pitch adjustment mechanism 36 for controlling the pitch angle of the rotor blades 22. Additionally, the communications module 116 may permit the controller 110 to transmit control signals 130 to the yaw drive 48 for controlling the yaw angle of the nacelle 16. In this respect, the communications module 116 may be any combination of suitable wired and/or wireless communication interfaces that communicatively couple the sensors 102, 104, 106, 108, the pitch adjustment mechanisms 36, and the yaw drive 48 to the controller 110.

Referring again to FIG. 3, in some embodiments, the system 100 may include a user interface 131 configured to allow interaction between a user and the controller 110. More specifically, the user interface 131 may be communicatively coupled to the controller 110 to permit feedback signals (e.g., as indicated by arrow 133 in FIG. 3) to be transmitted from the controller 110 to the user interface 131. In this respect, the user interface 131 may include one or more feedback devices (not shown), such as display screens, speakers, warning lights, etc., which communicate the feedback from the controller 110 to the user. In one embodiment, the user interface 131 may be located at a remote location (e.g., a control center for a wind farm) from the wind turbine 10. In such embodiment, the controller 110 and the user interface 131 may be communicatively coupled via the Internet or another suitable network. In alternate embodiments, however, the system 100 may not include the user interface 131.

In general, the controller 110 may be configured to monitor the wear on the gearbox 30 by executing various logic stored on the memory device(s) 114. In particular, the controller 110 (e.g., via the processor(s) 112) executes the logic to determine an accumulated wear value for the gearbox 30 based on the data received from the sensors 102, 104, 106, 108 and/or data stored in the memory device(s) 114. When the accumulated wear value exceeds a wear threshold, the controller 110 may initiate various control actions associated with reducing the rate at which the gearbox 30 incurs additional wear.

The controller 110 may be configured to determine or estimate a torque exerted on the rotor shaft 28 or the generator shaft 34 associated with the torque sensor 102. More specifically, as mentioned above, the controller 110 is communicatively coupled to the torque sensor 102. In this respect, the controller 110 receives the torque measurement signals 120 from the torque sensor 102. In the embodiment shown in FIG. 3, the torque sensor 102 is operatively associated with the generator shaft 34. In such embodiments, the torque measurement signals 120 are indicative of the torque exerted on the generator shaft 34. The controller 110 may include torque measurement logic 132 having one or more mathematical functions and/or one or more look-up tables. By executing the torque measurement logic 132, the controller 110 may determine a measured torque (e.g., as indicated by arrow 134 in FIG. 3) exerted on the generator shaft 34 based on the received torque measurement signals 120. Nevertheless, in embodiments where the torque sensor 102 is operatively associated with the rotor shaft 28, the controller 110 may execute the torque measurement logic 132 to determine a measured torque exerted on the rotor shaft 28.

In several embodiments, the controller 110 may be configured to determine or calculate a torque exerted on the other of the rotor shaft 28 or the generator shaft 34 based on the determined torque 134. As such, the controller 110 may include gearbox torque efficiency logic 136 having one or more mathematical functions and/or one or more look-up tables. By executing the gearbox torque efficiency logic 136, the controller 110 may determine a calculated torque (e.g., as indicated by arrow 138 in FIG. 3) exerted on the rotor shaft 28 based on the determined torque 134 exerted on the generator shaft 34. Nevertheless, in embodiments where the torque sensor 102 is operatively associated with the rotor shaft 28, the controller 110 may execute the gearbox torque efficiency logic 136 to determine a calculated torque exerted on the generator shaft 34. In alternative embodiments, the system 100 may include one torque sensor 102 in operative association with the rotor shaft 28 and another torque sensor 102 in operative association with the generator shaft 34. In such embodiments, the controller 110 may be configured to determine (e.g., by executing the torque measurement logic 132) the torque exerted on both shafts 28, 34 based on the torque measurement signals 120 received from the torque sensors 102.

The controller 110 may also be configured to determine or estimate a rotational speed of the rotor shaft 28 or the generator shaft 34 associated with the rotational speed sensor 104. More specifically, as mentioned above, the controller 110 is communicatively coupled to the rotational speed sensor 104. In this respect, the controller 110 receives the rotational speed measurement signals 122 from the torque sensor 102. In the embodiment shown in FIG. 3, the rotational speed sensor 104 is operatively associated with the generator shaft 34. In such embodiments, the rotational speed measurement signals 122 are indicative of the rotational speed of the generator shaft 34. The controller 110 may include rotational speed measurement logic 140 having one or more mathematical functions and/or one or more look-up tables. By executing the rotational speed measurement logic 140, the controller 110 may determine a measured rotational speed (e.g., as indicated by arrow 142 in FIG. 3) of the generator shaft 34 based on the received rotational speed measurement signals 104. Nevertheless, in embodiments where the rotational speed sensor 104 is operatively associated with the rotor shaft 28, the controller 110 may execute the rotational speed measurement logic 140 to determine a measured rotational speed of the rotor shaft 28.

In some embodiments, the controller 110 may be configured to determine or calculate a rotational speed of the other of the rotor shaft 28 or the generator shaft 34 based on the measured rotational speed 142. As such, the controller 110 may include gearbox rotational speed efficiency logic 144 having one or more mathematical functions and/or one or more look-up tables. By executing the gearbox rotational speed efficiency logic 144, the controller 110 may determine a calculated rotational speed (e.g., as indicated by arrow 146 in FIG. 3) of the rotor shaft 28 based on the measured rotational speed 142 of the generator shaft 34. Nevertheless, in embodiments where the rotational speed sensor 104 is operatively associated with the rotor shaft 28, the controller 110 may execute the gearbox rotational speed efficiency logic 144 to determine the rotational speed of the generator shaft 34. In alternative embodiments, the system 100 may include one rotational speed sensor 104 in operative association with the rotor shaft 28 and/or another rotational speed sensor 104 in operative association with the generator shaft 34. In such embodiments, the controller 110 may be configured to determine (e.g., by executing the rotational speed measurement logic 140) the rotational speed of both shafts 28, 34 based on the rotational speed measurement signals 122 received from the rotational speed sensors 104.

Furthermore, the controller 110 may be configured to determine or calculate a stress value for the gearbox 30 based on the torques 134, 138 and the rotational speeds 142, 146. In general, the stress value may be indicative of a magnitude or a level of stress experienced by one or more components (e.g., bearings, gears, etc.) of the gearbox 30. This stress may be caused by the torques 134, 138 exerted on the corresponding shafts 28, 34. As shown in FIG. 3, the controller 110 may include stress logic 148 having one or more mathematical functions and/or one or more look-up tables. By executing the stress logic 148, the controller 110 may determine or calculate the stress value (e.g., as indicated by arrow 150 in FIG. 3) of the gearbox 30 or one or more components of the gearbox 30 based on the respective torques 134, 138 and rotational speeds 142, 146 of the rotor shaft 28 and the generator shaft 34.

In certain embodiments, the controller 110 may be configured to assign a positive value to one of the torque 138 exerted on the rotor shaft 28 or the torque 134 exerted on the generator shaft 34 and a negative value to the other of the torque 138 exerted on the rotor shaft 28 or the torque 134 exerted on the generator shaft 34. For example, in one embodiment, the controller 110 may be configured to assign the torque 138 exerted on the rotor shaft 28 a positive value and the torque 134 exerted on the generator shaft 34 a negative value. As such, the controller 110 is able to account for torque reversals in the gearbox 30 when determining the stress value 150. For example, in one embodiment, a torque reversal may occur when the rotor 18 changes its direction of rotation. By accounting for torque reversals, the system 100 provides a more accurate determination of the stress value.

In the embodiment shown in FIG. 3, the controller 110 includes an internal clock 152 configured to monitor a time duration (e.g., as indicated by arrow 154 in FIG. 3) over which the gearbox 30 experiences the stress value 150. In alternative embodiment, the controller 110 may receive a signal (not shown) from an external time keeping device (not shown) indicative of the duration of time over which the gearbox 30 experiences the stress value 150.

Moreover, the controller 110 is configured to determine an accumulated wear value for the gearbox 30 based on the stress value 150 and the time duration 154. In general, the accumulated wear value may be indicative the remaining life of the gearbox 30 or certain components of the gearbox 30 based on the magnitude and duration of the stress experienced by the gearbox 30 throughout its operational life. For example, in one embodiment, the accumulated wear value may be a percentage or ratio of the remaining life of the gearbox 30. As shown in FIG. 3, the controller 110 may include accumulated wear logic 156 having one or more mathematical functions and/or one or more look-up tables. In certain embodiments, the mathematical equations may include Miner's Rule method or any other suitable cumulative damage equations/functions. By executing the accumulated wear logic 156, the controller 110 may determine or calculate the accumulated wear value (e.g., as indicated by arrow 158 in FIG. 3) of the gearbox 30 or one or more components of the gearbox 30 based on the stress value 150 and the time duration 154. As described above, the stress value 150 is based on the torques 134, 138 and the rotational speeds 142, 146 of the rotor and generator shafts 28, 34. In this respect, the accumulated wear value 158 may also be based on the torques 134, 138 and the rotational speeds 142, 146.

In some embodiments, the controller 110 may be configured to determine or calculate the accumulated wear value 158 based on a previous accumulated wear value 158. More specifically, the accumulated wear value 158 may be determined at some regular interval or frequency. In general, during operation, the gearbox 30 incurs some amount of wear during between accumulated wear determinations. As such, the wear incurred by the gearbox 30 since the previous accumulated wear determination may be added to the previous value 158 such that the current accumulated wear value 158 reflects all wear incurred by the gearbox 30 at that time.

In particular embodiments, the controller 110 may be configured to identify one or more components of the gearbox 30 associated with the accumulated wear value 158 of the gearbox 30. In general, the gearbox 30 may include a plurality of components, such as various gears and bearings. In certain instances, particular components of the gearbox 30 may attribute to or otherwise be associated with the accumulated wear value 158 of the gearbox 30. For example, in one instance, a particular bearing within the gearbox 30 may have incurred the most wear on any component within the gearbox 30. In such instance, this bearing may be the component that limits the life of the gearbox 30. That is, this bearing is the reason for the particular accumulated wear value 158 of the gearbox 30. As mentioned above, the controller 110 may be communicatively coupled to the vibration sensor 106 and the acoustic sensor 108. In this respect, the controller 110 may receive the vibration measurement signals 124 from the vibration sensor 106 and/or acoustic measurement signals 126 from the acoustic sensor 108. As such, the controller 110 may include component identification logic 160 having one or more mathematical functions and/or one or more look-up tables. By executing the component identification logic 160, the controller 110 may identify or otherwise determine one or more components (e.g., as indicated by arrow 162 in FIG. 3) of the plurality of components forming the gearbox 30 that attribute to the accumulated wear value 158 of the gearbox 30. In alternative embodiments, the controller 110 may be configured to identify the components 162 based on other parameters (e.g., bearing temperature, oil temperature, etc.) in addition to or in lieu of the vibration measurement signals 124 and/or the acoustic measurement signals 126.

Additionally, the controller 110 is configured to initiate various control actions based on the accumulated wear value 158. As such, the controller 110 may include control action logic 164 having one or more mathematical functions and/or one or more look-up tables. By executing the control action logic 164, the controller 110 compares the accumulated wear value 158 to a wear threshold and initiates a control action associated with modifying a rate at which the gearbox 30 incurs wear when the accumulated wear value 158 exceeds the wear threshold. In one embodiment, the wear threshold may correspond to a percentage of total wear that the gearbox 30 is capable of incurring. In another embodiment, the wear threshold may correspond to a percentage of wear that the gearbox 30 is expected (e.g., as determined by design data and/or predicted operating profiles) to have incurred based on the time duration 154 of operation. Nevertheless, the wear threshold may be based on any other suitable criteria. As will be described below, the controller 110 may be configured to initiate control actions by at least one of transmitting the feedback signals 133 to the user interface 131, transmitting the control signals 128 to the pitch adjustment mechanisms 36, or transmitting the control signals 130 to the yaw drive 48.

In several embodiments, the controller 110 may be configured to initiate a control action associated with notifying an operator of the wind turbine 10 that the accumulated wear value 158 has exceeded the wear threshold. For example, when the accumulated wear value 158 exceeds the wear threshold, the controller 110 may be configured to transmit the feedback signals 133 to the user interface 131. The feedback signals 133 instruct the user interface 131 to present a visual or audible notification or indicator to the operator of the wind turbine 10 indicating that the accumulated wear value 158 has exceeded the wear threshold. As mentioned above, in particular embodiments, the controller 110 may be configured to determine one or more components of the gearbox 30 associated with the accumulated wear value 158. In such embodiments, the feedback signals 133 may also instruct the user interface 131 to provide an indication of the one or more components of the gearbox 30 associated with the accumulated wear value 158.

Furthermore, the controller 110 may be configured to initiate a control action associated with changing an output of the generator 24 (FIGS. 1 and 2). For example, when the accumulated wear value 158 exceeds the wear threshold, the controller 110 may be configured to transmit the control signals 128 to the pitch adjustment mechanisms 36. The control signals 128 instruct each pitch adjustment mechanism 36 to adjust the current pitch angle of the corresponding rotor blade 22 (FIG. 1) to a new pitch angle such that the generator 24 produces more or less power. For example, when the wear value is higher than expected, the new pitch angle may cause the generator to produce less power. Conversely, when the wear value is lower than expected, the new pitch angle may cause the generator to produce more power. Additionally, the controller 110 may be configured to transmit the control signals 130 to the yaw drive 48 when the accumulated wear value 158 exceeds the wear threshold. The control signals 130 instruct yaw drive 48 (e.g., the yaw adjustment mechanisms 50 (FIG. 2) and/or brake assemblies 60) to adjust the current yaw angle of the nacelle 16 (FIGS. 1 and 2) to a new yaw angle such that the generator 24 produces more or less power. Nevertheless, in such embodiments, the controller 110 may be configured to initiate any suitable control action associated with changing the output of the generator 24.

Moreover, in several embodiments, the controller 110 may be configured to initiate a control action associated with terminating power generation of the generator 24 (FIGS. 1 and 2). For example, when the accumulated wear value 158 exceeds the wear threshold, the controller 110 may be configured to transmit the control signals 128 to the pitch adjustment mechanisms 36. The control signals 128 instruct each pitch adjustment mechanism 36 to adjust the current pitch angle of the corresponding rotor blade 22 (FIG. 1) to a feathered position such that the generator 24 ceases to produce power. Additionally, the controller 110 may be configured to transmit the control signals 130 to the yaw drive 48 when the accumulated wear value 158 exceeds the wear threshold. The control signals 130 instruct yaw drive 48 (e.g., the yaw adjustment mechanisms 50 (FIG. 2)) to adjust the current yaw angle of the nacelle 16 (FIGS. 1 and 2) to a new yaw angle such that the generator 24 ceases to produce power. Nevertheless, in such embodiments, the controller 110 may be configured to initiate any suitable control action associated with terminating power generation of the generator 24.

In several embodiments, the controller 110 may be configured to compare the accumulated wear value 158 to a plurality of wear thresholds and initiate specific control actions based on the particular wear threshold that the accumulated wear parameter 158 exceeds. For example, the controller 110 may be configured to compare the accumulated wear value 158 to a first wear threshold, a second wear threshold, and a third wear threshold. In general, the second wear threshold may be higher than the first wear threshold, and the third wear threshold may be higher than the second wear threshold. In one embodiment, the first, second, and third wear thresholds may respectively be ninety percent, ninety-five percent, and ninety-nine percent of the total wear that the gearbox 30 is able to incur. Although, in other embodiments, the first, second, and third wear thresholds may be any suitable values. As such, the controller 110 may be configured to initiate a control action associated with notifying an operator of the wind turbine 10 when the accumulated wear value 158 exceeds the first wear threshold. When the accumulated wear value 158 exceeds the second wear threshold, the controller 110 may be configured to initiate a control action associated with derating the generator 24. Furthermore, the controller 110 may be configured to initiate a control action initiate a control action associated with terminating power generation of the generator 24 when the accumulated wear value 158 exceeds the third wear threshold. For example, in one embodiment, the control action may be associated with engaging the braking system 64 when the accumulated wear value 158 exceeds the third wear threshold to protect the drivetrain 26 and wind turbine 10 from damage due to excessive wear. In such embodiment, the controller 110 may be configured to transmit suitable control signals (e.g., as indicated by arrow 166 in FIG. 3) to the braking system 64 that instruct the braking system 64 to frictionally engage the drivetrain 26, thereby stopping rotation of the drivetrain 26. Nevertheless, the controller 110 may be configured to initiate any suitable control action when the accumulated wear value exceeds any wear threshold.

Figure 5:
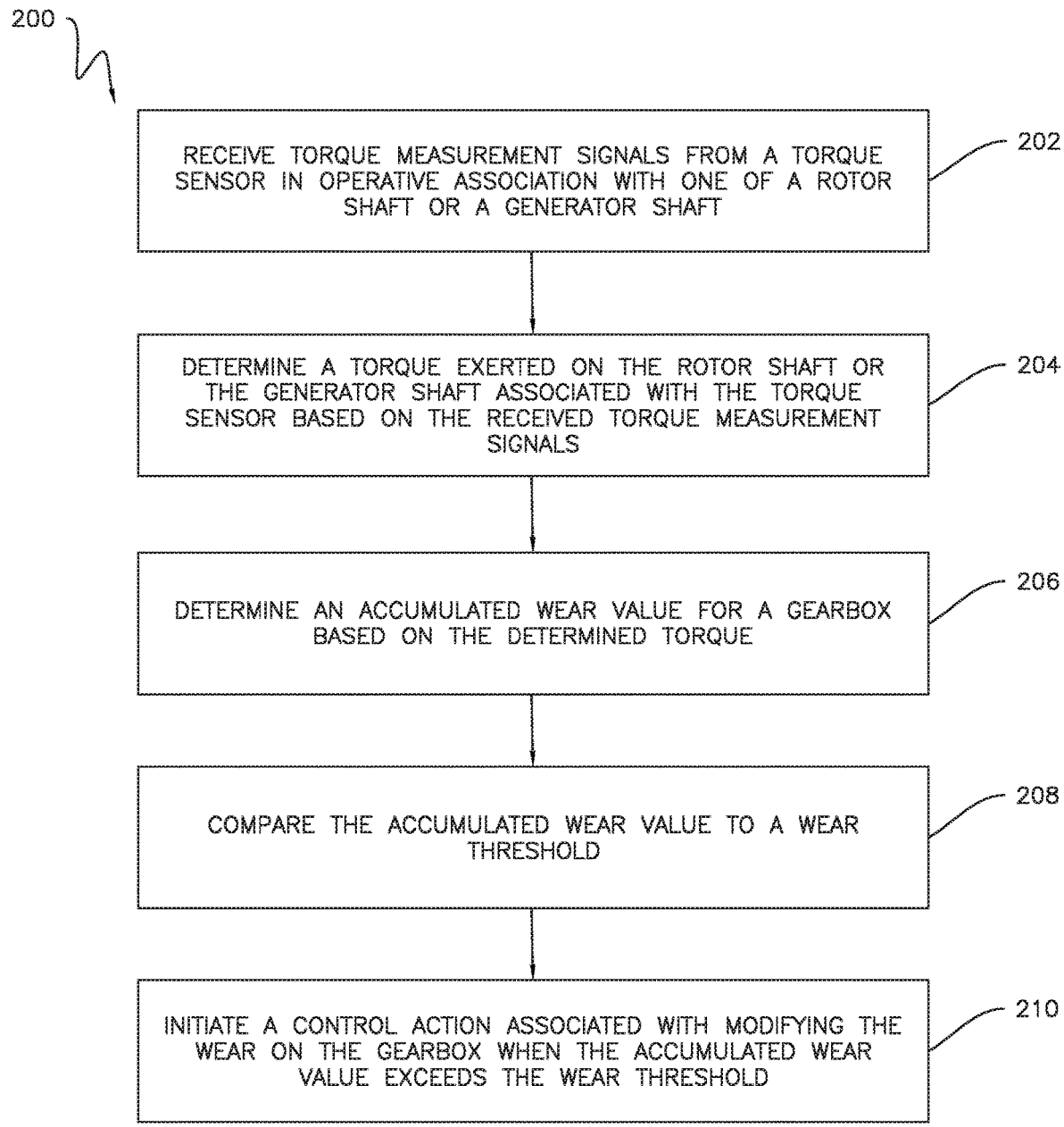
FIG. 5 is a flow chart illustrating a method for monitoring wear on a gearbox of a wind turbine according to one embodiment of the present disclosure.

FIG. 5 illustrates one embodiment of a method 200 for monitoring wear on a gearbox of a wind turbine in accordance with aspects of the present subject matter. Although FIG. 5 depicts steps performed in a particular order for purposes of illustration and discussion, the methods discussed herein are not limited to any particular order or arrangement. As such, the various steps of the methods disclosed herein can be omitted, rearranged, combined, and/or adapted in various ways without deviating from the scope of the present disclosure.

As shown in FIG. 5, at (202), the method 200 may include receiving, with a controller, torque measurement signals from a torque sensor in operative association with one of a rotor shaft or a generator shaft. For example, in the embodiment shown in FIG. 3, the torque sensor 102 is in operative association with the generator shaft 34. Furthermore, as described above, the controller 110 may be communicatively coupled to the torque sensor 102. As such, the controller 110 may be configured to receive the torque measurement signals 120 indicative of the torque exerted on the generator shaft 34 from the torque sensor 102. In alternative embodiments, the torque sensor 102 may be in operative association with the rotor shaft 28 such that the controller 110 may be configured to receive the torque measurement signals 120 indicative of the torque exerted on the rotor shaft 28.

At (204), the method 200 may include determining, with the controller, a torque exerted on the rotor shaft or the generator shaft associated with the torque sensor based on the received torque measurement signals. For example, as described above, the controller 110 may be configured to determine or estimate (e.g., by executing the torque measurement logic 132) the torque 134 exerted on generator shaft 34 based on the received measurement signals 120. Nevertheless, in alternative embodiments, the controller 110 may be configured to determine or estimate the torque 128 exerted on the rotor shaft 28 based on the received measurement signals 120 when the torque sensor 102 is in operative association with the rotor shaft 28.

Furthermore, at (206), the method 200 may include determining, with the controller, an accumulated wear value for the gearbox based on the determined torque. For example, as described above, the controller 110 may be configured to determine or calculate (e.g., by executing the stress logic 148) a stress value 150 based at least in part on the determined torque 134. The controller 110 may then be configured to determine or calculate (e.g., by executing the accumulated wear logic 156) an accumulated wear value 158 based at least in part on the stress value 150.

Moreover, at (208), the method 200 may include comparing, with the controller, the accumulated wear value to a wear threshold. For example, as described above, the controller 110 may be configured to compare (e.g., by executing the control action logic 164) the determined accumulated wear value 158 to a wear threshold.

Additionally, at (210), the method 200 may include initiating, with the controller, a control action associated with modifying a rate at which the gearbox incurs wear when the accumulated wear value exceeds the wear threshold. For example, as described above, the controller 110 may be configured to initiate (e.g., by executing the control action logic 164) a control action associated with modifying a rate at which the gearbox 30 incurs wear when the accumulated wear value 158 exceeds the wear threshold. Such control actions may include notifying an operator of the wind turbine 10, changing the output of the generator 24 of the wind turbine 10, and/or terminating power generation of the wind turbine 10.

The disclosed system 100 and method 200 for monitoring wear on a gearbox of a wind turbine provide advantages over conventional wear monitoring systems and methods. For example, as described above, the system 100 and method 200 determine the wear on the gearbox (i.e., the accumulated wear value 158) based the torque exerted on the rotor and/or the generator shafts coupled to the gearbox. In this respect, and unlike with conventional systems and methods, the system 100 and the method 200 account for the actual conditions experienced by the gearbox, which, as mentioned above, may vary greatly from the predicted conditions, during wear determinations. Furthermore, in some embodiments, and unlike with conventional systems and methods, the system 100 and the method 200 may account for torque reversals when determining wear on gearbox. Such torque reversals may greatly impact the wear incurred by the gearbox. As such, the system 100 and the method 200 provide more accurate determination of the wear incurred by the gearbox than conventional systems and methods, thereby reducing unplanned downtime of the wind turbine.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for monitoring wear on a gearbox of a wind turbine, the system comprising:
   a wind turbine including a rotor, a gearbox, a rotor shaft coupling the rotor and the gearbox, a generator, and a generator shaft coupling the gearbox and the generator;
   a first sensor configured to detect a parameter indicative of a torque exerted on the rotor shaft or the generator shaft; and,
   a controller communicatively coupled to the first sensor, the controller being configured to determine the torque exerted on the rotor shaft or the generator shaft based on measurement signals received from the first sensor, the controller further being configured to determine an accumulated wear value for the gearbox based on the torque.

2. The system of claim 1, wherein the controller is further configured to determine a torque exerted on the other of the rotor shaft or the generator shaft based on the determined torque exerted on the rotor shaft or the generator shaft.

3. The system of claim 2, wherein the controller is further configured to assign a positive value to one of the torque exerted on the rotor shaft or the torque exerted on the generator shaft and a negative value to the other of the torque exerted on the rotor shaft or the torque exerted on the generator shaft.

4. The system of claim 1, wherein the controller is further configured to determine a stress value for the gearbox based on the torque, the controller being further configured to determine the accumulated wear value based on the stress value.

5. The system of claim 3, wherein the controller is further configured to monitor a duration during which the gearbox experiences the stress value and determine the accumulated wear value based on the duration of the stress value.

6. The system of claim 1, further comprising:
   a rotational speed sensor in operative association with one of the rotor shaft or the generator shaft, the rotational speed sensor being configured to detect a parameter indicative of a rotational speed of the rotor shaft or the generator shaft associated with the rotational speed sensor, the rotational speed sensor being communicatively coupled to the controller, the controller being further configured to:
   determine a rotational speed of the rotor shaft or the generator shaft associated with the rotational speed sensor based on rotational speed measurement signals received from the rotational speed sensor;
   determine a rotational speed of the other of the rotor shaft or the generator shaft based on the rotational speed of the rotor shaft or the generator shaft associated with the rotational speed sensor; and,
   determine the accumulated wear value based on the rotational speed of the rotor shaft and the rotational speed of the generator shaft.

7. The system of claim 1, wherein the gearbox comprises a plurality of gearbox components, the system further comprising:
   a vibration sensor in operative association with the gearbox, the vibration sensor being configured to detect a parameter indicative of vibrations occurring within or emitted by the gearbox; and,
   an acoustic sensor in operative association with the gearbox, the acoustic sensor being configured to detect a parameter indicative of sounds occurring within or emitted by the gearbox, the controller being communicatively coupled to the vibration sensor and the acoustic sensor, the controller further being configured to identify one or more gearbox components of the plurality of gearbox components associated with the accumulated wear value of the gearbox based on at least one of vibration measurement signals received from vibration sensor or acoustic measurement signals received from the acoustic sensor.

8. The system of claim 1, wherein the controller is further configured to compare the accumulated wear value to a wear threshold and initiate a control action associated with modifying a rate at which the gearbox incurs wear when the accumulated wear value exceeds the wear threshold.

9. The system of claim 1, wherein the control action is associated with changing an output of the generator.

10. The system of claim 1, wherein the control action is associated with notifying an operator of the wind turbine that the accumulated wear value has exceeded the wear threshold.

11. A method for monitoring wear on a gearbox of a wind turbine, the wind turbine comprising a rotor, a gearbox, a rotor shaft coupling the rotor and the gearbox, a generator, and a generator shaft coupling the gearbox and the generator, the method comprising:

receiving, with a controller, measurement signals from a first sensor, the measurement signals being indicative of a torque exerted on the rotor shaft or the generator shaft;

determining, with the controller, the torque exerted on the rotor shaft or the generator shaft based on the received measurement signals;

determining, with the controller, an accumulated wear value for the gearbox based on the torque;

comparing, with the controller, the accumulated wear value to a wear threshold; and, initiating, with the controller, a control action associated with reducing a rate at which the gearbox incurs wear when the accumulated wear value exceeds the wear threshold.

12. The method of claim 11, further comprising:
determining, with the controller, a torque exerted on the other of the rotor shaft or the generator shaft based on the determined torque exerted on the other of the rotor shaft or the generator shaft.

13. The method of claim 12, further comprising:
assigning, with the controller, a positive value to one of the torque exerted on the rotor shaft or the torque exerted on the generator shaft and a negative value to the other of the torque exerted on the rotor shaft or the torque exerted on the generator shaft.

14. The method of claim 11, further comprising:
determining, with the controller, a stress value for the gearbox based on the torque, the controller being further configured to determine the accumulated wear value based on the stress value.

15. The method of claim 13, further comprising:
monitoring, with the controller, a duration during which the gearbox experiences the stress value; and,
determining, with the controller, the accumulated wear value based on the duration of the stress value.

16. The method of claim 11, further comprising:
receiving, with the controller, rotational speed measurement signals from a rotational speed sensor in operative association with one of the rotor shaft or the generator shaft, the rotational speed measurement signals being indicative of a rotational speed of the rotor shaft or generator shaft associated with the rotational speed sensor;

determining, with the controller, a rotational speed of the rotor shaft or the generator shaft associated with the rotational speed sensor based on the received rotational speed measurement signals;

determining, with the controller, a rotational speed of the other of the rotor shaft or the generator shaft based on the received rotational speed measurement signals; and, determining, with the controller, the accumulated wear value based on the rotational speed of the rotor shaft and the rotational speed of the generator shaft.

17. The method of claim 11, wherein the gearbox comprises a plurality of gearbox components, the system further comprising:
receiving, with the controller, at least one of a vibration measurement signal indicative of vibrations occurring within or emitted from the gearbox from a vibration sensor in operative association with the gearbox or an acoustic measurement signal indicative of sounds occurring within the gearbox or emitted from the gearbox from an acoustic sensor in operative association with the gearbox; and, determining, with the controller, one or more gearbox components of the plurality of gearbox components associated with the accumulated wear value of the gearbox based on at least one of the vibration measurement signals or the acoustic measurement signals.

18. The method of claim 11, wherein initiating the control action comprises changing, with the controller, an output of the generator.

19. The method of claim 11, wherein initiating the control action comprises notifying, with the controller, an operator of the wind turbine that the accumulated damage value has exceeded the threshold.

20. The method of claim 11, wherein initiating the control action comprises terminating, with the controller, power generation of the wind turbine.

* * * * *